United States Patent
Tang et al.

(10) Patent No.: US 9,825,380 B2
(45) Date of Patent: Nov. 21, 2017

(54) OPTICAL MODULE WITH CASING

(71) Applicant: FOXCONN INTERCONNECT TECHNOLOGY LIMITED, Grand Cayman (KY)

(72) Inventors: Zhi-Hui Tang, Kunshan (CN); Sheng-Pin Gao, Kunshan (CN)

(73) Assignee: FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 0 days.

(21) Appl. No.: 15/410,709

(22) Filed: Jan. 19, 2017

(65) Prior Publication Data

US 2017/0222341 A1    Aug. 3, 2017

(30) Foreign Application Priority Data

Jan. 30, 2016   (CN) .......................... 2016 1 0062878

(51) Int. Cl.
| | |
|---|---|
| *H01R 12/58* | (2011.01) |
| *H01R 13/627* | (2006.01) |
| *H01R 12/72* | (2011.01) |
| *G02B 6/42* | (2006.01) |

(52) U.S. Cl.
CPC ............ *H01R 12/58* (2013.01); *G02B 6/428* (2013.01); *G02B 6/4257* (2013.01); *G02B 6/4261* (2013.01); *G02B 6/4292* (2013.01); *H01R 12/724* (2013.01); *H01R 13/6273* (2013.01)

(58) Field of Classification Search
CPC .. G02B 6/4292; G02B 6/4278; G02B 6/4246; G02B 6/4262

USPC ..... 385/88, 92, 94; 439/63, 581, 381, 79, 80
See application file for complete search history.

(56) References Cited

U.S. PATENT DOCUMENTS

| | | | | |
|---|---|---|---|---|
| 3,697,933 | A * | 10/1972 | Black ................... | H01R 12/727 439/686 |
| 5,117,476 | A * | 5/1992 | Yingst .................. | G02B 6/4246 385/49 |
| 5,540,598 | A * | 7/1996 | Davis ................... | H01R 12/724 439/79 |
| 6,183,270 | B1 * | 2/2001 | Huang ................. | H01R 12/727 439/541.5 |
| 6,835,091 | B2 * | 12/2004 | Oleynick ............ | H01R 12/716 439/541.5 |
| 7,311,530 | B2 * | 12/2007 | Ice ....................... | H05K 3/3405 385/88 |

(Continued)

FOREIGN PATENT DOCUMENTS

| | | |
|---|---|---|
| CN | 103140127 | 6/2013 |
| CN | 203658626 | 6/2014 |

*Primary Examiner* — Gary Paumen
(74) *Attorney, Agent, or Firm* — Wei Te Chung; Ming Chieh Chang

(57) ABSTRACT

An optical module includes an optical transceiver and the fastening structure wherein the optical transceiver includes a body, a plurality of first connecting legs extending along a first direction from the body, a plurality of second connecting legs extending initially from the body along the second direction perpendicular to the first direction, and successively along the first direction. The fastening structure includes a plurality of through holes through which the first connecting legs and the second connecting legs extend so as to be mounting to an external printed circuit board under said optical module.

17 Claims, 7 Drawing Sheets

(56) References Cited

U.S. PATENT DOCUMENTS

| | | | | |
|---|---|---|---|---|
| 7,331,801 B1* | 2/2008 | Eichorn | ............... | H01R 12/724 |
| | | | | 439/76.1 |
| 7,396,166 B1* | 7/2008 | Chou | ................... | G02B 6/4201 |
| | | | | 385/14 |
| 7,478,953 B2 | 1/2009 | Tanaka | | |
| 7,762,730 B2 | 7/2010 | Kihara et al. | | |
| 2003/0235375 A1* | 12/2003 | Kamath | ............... | G02B 6/4201 |
| | | | | 385/92 |
| 2004/0105239 A1* | 6/2004 | Chiang | ................ | G02B 6/4201 |
| | | | | 361/728 |
| 2005/0226626 A1* | 10/2005 | Zhang | ................... | G02B 6/4246 |
| | | | | 398/135 |
| 2009/0052898 A1* | 2/2009 | Oki | ...................... | G02B 6/4246 |
| | | | | 398/79 |
| 2010/0135620 A1* | 6/2010 | Chou | ................... | G02B 6/4201 |
| | | | | 385/88 |
| 2013/0051736 A1* | 2/2013 | Chang | ................. | G02B 6/4293 |
| | | | | 385/92 |
| 2014/0355997 A1 | 12/2014 | Miao et al. | | |

* cited by examiner

OPTICAL MODULE WITH CASING

BACKGROUND OF THE INVENTION

1. Field of the Invention

The present invention relates to an optical module, and particularly to the optical module with retention mechanism for retaining connecting legs of the optical transceiver.

2. Description of Related Art

The Chinese Patent No. CN203658626U issued on Jun. 18, 2014 discloses a optical transceiver (BOSA), including a body, a plurality of first connecting legs extending in a first direction from the body, and a plurality of second connecting legs extending initially in a second direction from the body and successively in the first direction, both said first connecting legs and said second connecting legs being mounted to the printed circuit board. The printed circuit board has the corresponding through holes for receiving the first connecting leg and the second connecting legs. Because the first connecting legs and the second connecting legs are relatively fragile to be deviated from the true positions. It is required to manually adjust the positions of the connecting legs during mounting the optical transceiver upon the printed circuit board.

Therefore, it is desired to have an optical module with the reliable connecting legs to be easily mounted upon the printed circuit board without manually adjusting the connecting legs.

SUMMARY OF THE INVENTION

An optical module includes an optical transceiver and the fastening structure wherein the optical transceiver includes a body, a plurality of first connecting legs extending along a first direction from the body, a plurality of second connecting legs extending initially from the body along the second direction perpendicular to the first direction, and successively along the first direction. The fastening structure includes a plurality of through holes through which the first connecting legs and the second connecting legs extend so as to be mounting to an external printed circuit board under said optical module.

Compared with the prior arts, the invention has the optical module equipped with the fastening structure to regulate the first connecting legs and the second connecting legs for facilitating inserting the first connecting legs and the second connecting legs into the corresponding through holes in the printed circuit board advantageously.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
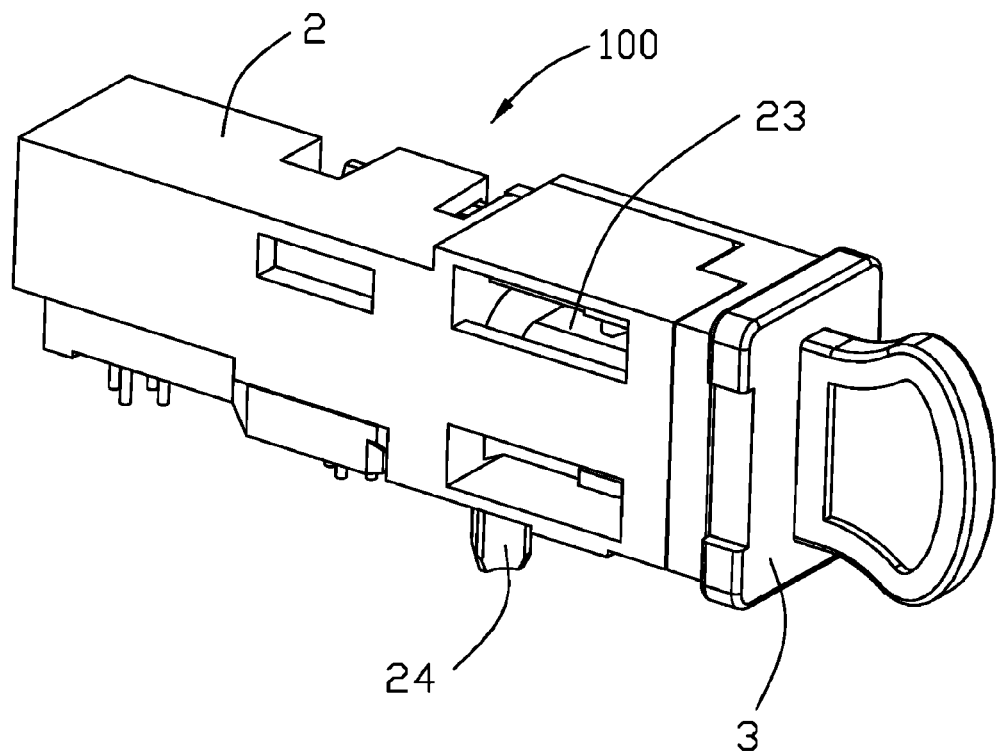
FIG. 1 is a perspective view of the optical module according to the presently preferred embodiment of the invention.
Figure 2:
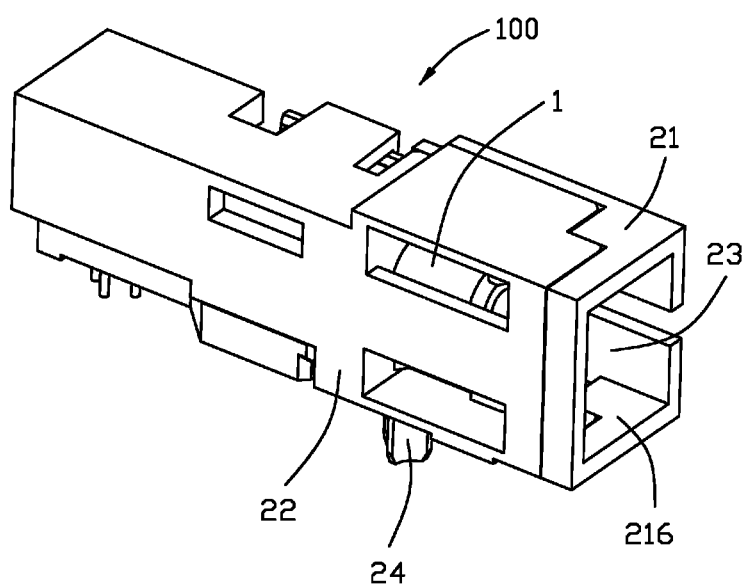
FIG. 2 is a perspective view of the optical module of FIG. 1 without the dust cover.
Figure 3:
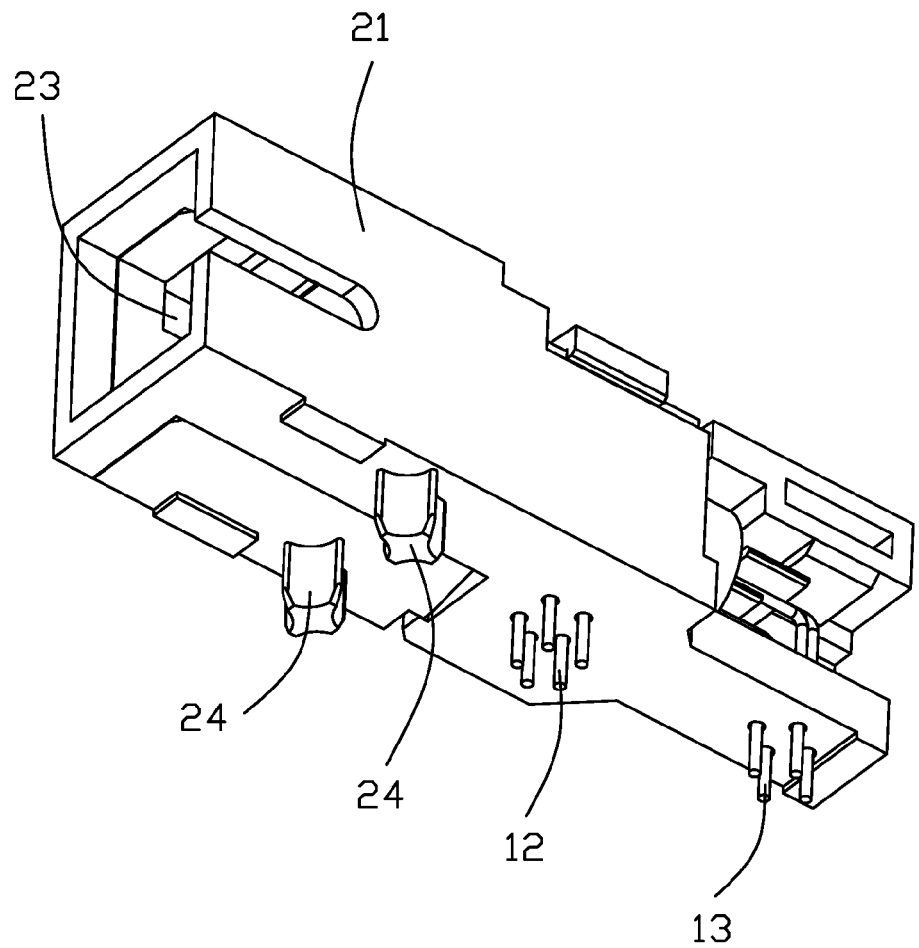
FIG. 3 is another perspective view of the optical module of FIG. 2.
Figure 4:
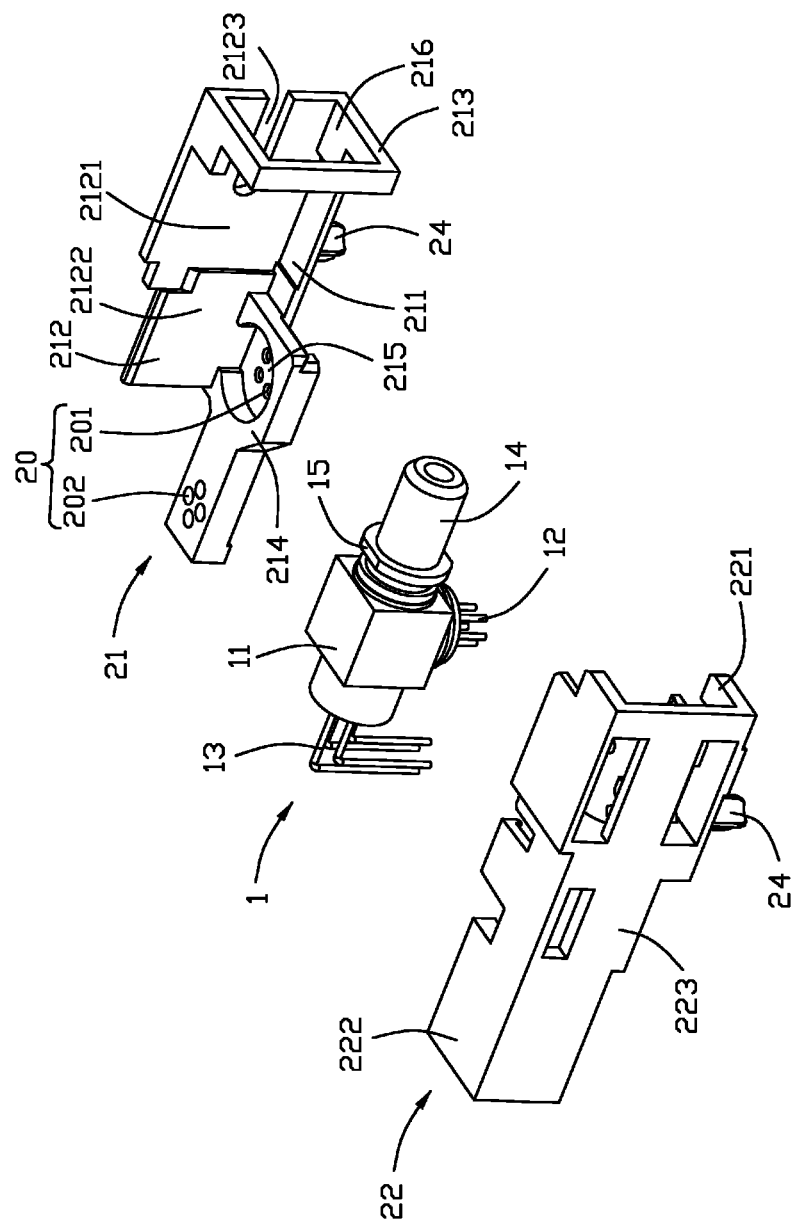
FIG. 4 is an exploded perspective view of the optical module of FIG. 2.
Figure 5:
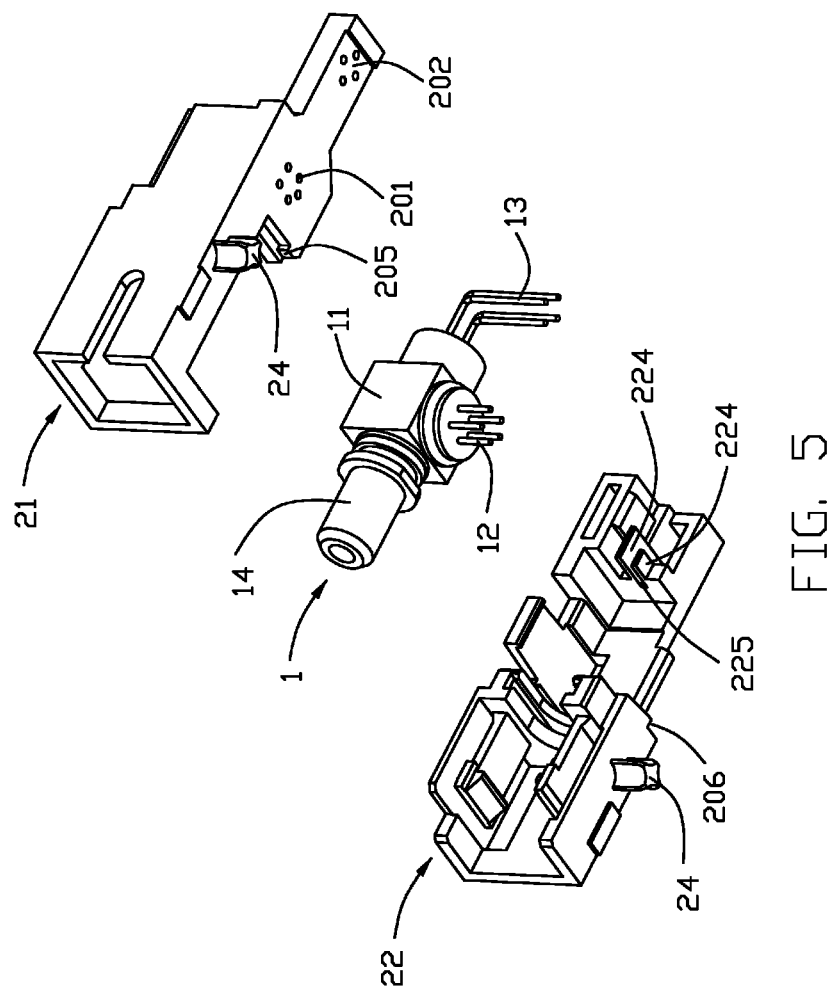
FIG. 5 is another exploded perspective view of the optical module of FIG. 5.
Figure 6:
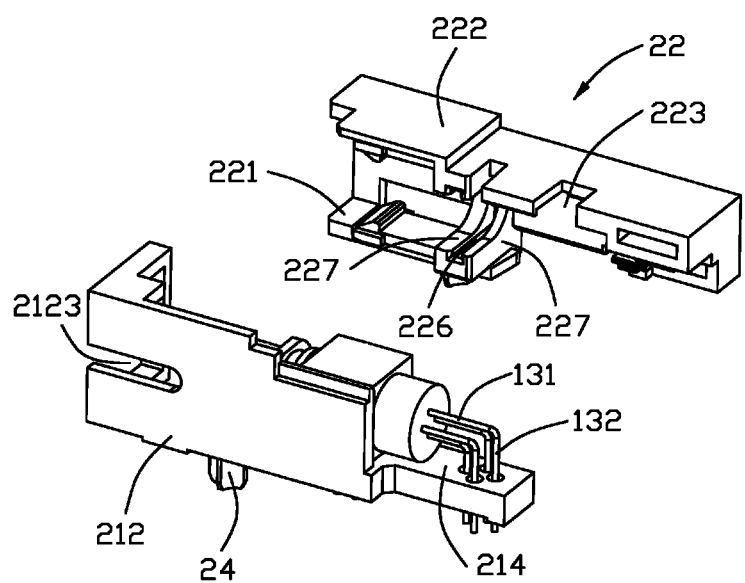
FIG. 6 is an exploded perspective view of the optical module of FIG. 1 where the optical transceiver is already assembled to the left half of the fastening structure.
Figure 7:
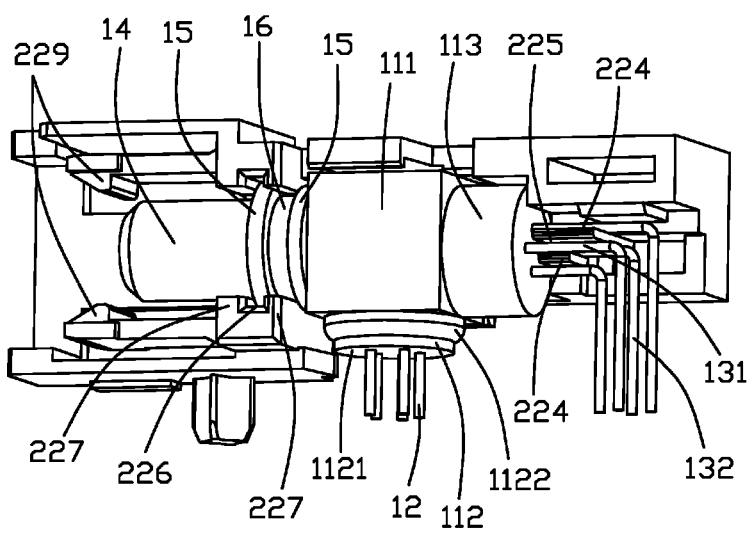
FIG. 7 is an exploded perspective view of the optical module of FIG. 1 wherein the left half of the fastening structure is removed.

Referring to FIGS. 1-7, an optical module 100 includes an optical transceiver 1, a fastening structure 2 and a dust cover 3. The optical transceiver 1 is of a BOSA module, the dust cover 3 is located at a front opening 216 of the fastening structure 2 for preventing dust contamination from the chip inside the optical transceiver 1. The fastening structure 2 and the dust cover 3 are both made of plastic.

The optical transceiver 1 includes a body 11, a plurality of first connecting legs 12 along the first direction, a plurality of second connecting legs 13 initially extending along the second direction perpendicular to the first direction, and successively along the first direction. In this embodiment, the first direction is the vertical direction and the second direction is the front-to-back direction.

The fastening structure 2 includes a plurality of through holes 20 through which the first connecting legs 12 and the second connecting legs 13 extend. The first connecting legs 12 and the second connecting legs 13 are mounted to the corresponding through holes of an external printed circuit board (not shown) on which the optical module 100 is mounted. The through holes 20 are used to assure true positions of the first connecting legs 12 and those of the second connecting legs 13 for facilitating mounting the optical module 100 upon the printed circuit board. The fastening structure 2 includes a left/first half 21 and a right/second half 22 commonly forming a receiving cavity 23 with a front opening 216, wherein the body 11 of the optical transceiver 1 is received in the receiving cavity 23. The left half 21 and the right half 22 are respectively equipped with the mounting posts 24 for mounting to the printed circuit board.

The left half 21 includes a bottom wall 211 with a plurality of through holes 20 formed therein, the left side wall 212 and the front wall 213. The plurality of through holes 20 include the first through holes 201 for extension of the first connecting legs 12, and the second through holes 202 for extension of the second connecting legs 13, wherein the first through holes 201 are closer to the front wall 213 than the second through holes 202 are. The bottom wall 211 includes a platform 214 and a recess 215 wherein the first through holes 201 is formed under the recess 215. The front opening 216 extends through the front wall 213 to have the receiving cavity 23 communicate with the exterior. The left side wall 212 includes a left front side wall 2121 close to the front wall 211, and a left rear side wall 2122 behind the left front side wall 2121. The left rear side wall 2122 protrudes further toward the receiving cavity 23, compared with the left front side wall 2121. A guiding slot 2123 is formed in the left front side wall 2121 along the front-to-back direction.

The right half 22 includes a bottom wall 221, a top wall 222, a right side wall 223 and a plurality of divider 224 extending from an interior surface of the right side wall 223 toward the left side wall 212 wherein the second connecting legs 13 are retained in the retaining groove 225 between the dividers 224. The second connecting leg 13 includes a horizontal section 131 extending along the front-to-back direction, and the vertical section extending along the vertical direction. The horizontal section 131 is received within the retaining groove 225 so as to prevent upward movement of the second connecting leg 13 during mounting to the printed circuit board. Notably, in this embodiment, the left half 21 and the right half 22 are assembled and fixed to each other in a transverse direction with the lock 205 on the left half 21 engaged with the lock 206 on the right half 22. In this embodiment, the right half 22 further includes a pair of resilient latches 229 by two sides of the ferrule 14 in the vertical direction for locking the coupled optical connector (not shown).

The optical transceiver 1 further includes a ferrule 14 connected at the front end of the body 11 while the second connecting legs 13 extend from a rear end of the body 11. The ferrule 14 includes two rings 15 with a groove 16 therebetween. The right half 22 forms two dividers 227 with a retaining groove 226 therebetween to receive the front ring 15, and the rear ring 15 is located behind the rear divider 227 which is received in the groove 16. Because the right half 22 forms the retaining groove 226 for securing the front ring 15, the optical transceiver 1 can be secured within the fastening structure 1.

The body 11 includes a square middle portion 111, a first column 112 connected to the bottom of the middle portion 111, and a second column 113 connected to a rear end of the middle portion 111. The first connecting legs 12 extend from the first column 112 while the second connecting legs 13 extend from the second column 113. The ferrule 14 is located in the receiving cavity 23 in front of the divider 227 while the middle portion 111, the first column 112 and the second column 113 are located in the receiving cavity 23 behind the divider 227. The first column 112 includes a lower column part 1121 received within the recess 215, and an upper column part 1122 located between the middle portion 111 and the lower column part 1121 wherein the lower column part 1121 is diametrically smaller than the upper column part 1122.

Notably, in this embodiment, the optical transceiver 1 is firstly assembled to the left half 21 in the first direction, and then the left half 21 with the associated optical transceiver 1 commonly assembled to the right half 22 in the third/transverse direction to finalize the whole optical module 100 wherein the left half 21 forms the first through holes 201 and the second through 202 for controlling the transverse positions of the first connecting legs 12 and the second connecting legs 13 while the right half 22 provides retaining groove 225 for controlling the vertical positions of the L-shaped second connecting legs.

However, the disclosure is illustrative only, changes may be made in detail, especially in matter of shape, size, and arrangement of sections within the principles of the invention.

What is claimed is:

1. An optical module comprising:
    an optical transceiver includes a body with a plurality of first connecting legs downwardly extending therefrom in a first direction, and a plurality of second connecting legs extending initially rearwardly in a second direction perpendicular to said first direction and successively downwardly in the first direction;
    a fastening structure forming a plurality of through holes through which both said first connecting legs and said second connecting legs extend downwardly, respectively, in the vertical direction so as to control the transverse positions of both said first connecting legs and said second connecting legs.

2. The optical module as claimed in claim 1, wherein the fastening structure includes a left half and a right half assembled together to form a receiving cavity to receive said optical transceiver therein and communicate with an exterior in the second direction.

3. The optical module as claimed in claim 2, wherein said left half and said right half are assembled to each other along a third direction perpendicular to both said first direction and said second direction.

4. The optical module as claimed in claim 2, wherein said through holes are all formed in one of said left half and said right half.

5. The optical module as claimed in claim 4, wherein the other of said left half and said right half forms a retaining groove to control vertical positions of the second connecting legs.

6. The optical module as claimed in claim 4, wherein said one of the left half and the right half forms a recess above the through holes to receive a column from which the first connecting legs downwardly extend in the first direction.

7. The optical module as claimed in claim 4, wherein said one of the left and said right half includes a corresponding side wall with a guiding slot extending along the second direction.

8. The optical module as claimed in claim 7, wherein said one of the left half and the right half further includes a front wall with a frame structure in alignment with the receiving cavity in the second direction.

9. The optical module as claimed in claim 2, wherein the optical transceiver includes a forwardly extending ferrule with a ring thereon, and one of said left half and said right half forms a retaining groove to snugly receive said ring.

10. The optical module as claimed in claim 9, wherein said one of the left half and the right half further includes a pair of latches by two sides of the ferrule in the second direction.

11. An optical module comprising:
    a fastening structure defining a receiving cavity forwardly communicating with an exterior along a front-to-back direction; and
    an optical transceiver having a body retained in the receiving cavity, a plurality of L-shaped connecting legs extending from a rear end of the body initially rearwardly along said front-to-back direction and successively downwardly along a vertical direction perpendicular to said front-to-back direction; wherein
    the fastening structure includes a first half and a second half arrange side by side with each other in a transverse direction perpendicular to both said vertical direction and said front-to-back direction; wherein
    said first half includes means for controlling transverse positions of the connecting legs and said second half includes means for controlling vertical positions of the connecting legs.

12. The optical module as claimed in claim 11, wherein the optical transceiver further includes a ferrule extending forwardly from the body, a pair of resilient latches by two sides of the body, and said pair of resilient latches are formed on the second half.

13. The optical module as claimed in claim 11, wherein said first half includes a side wall with a guiding slot extending along the front-to-back direction.

14. The optical module as claimed in claim 11, wherein the optical transceiver further includes a ferrule extending forwardly from the body with a retaining ring thereon, a retaining groove is formed in the second half to receive said retaining ring.

15. The optical module as claimed in claim 11, wherein the means of the first half includes a plurality of through holes which are located under a recess formed in the first half, and the optical transceiver further includes under the body a column which is received in the recess and from which some of the connecting legs downwardly extend.

16. The optical module as claimed in claim 11, wherein the first half is configured to allow the optical transceiver to be assembled thereto only in the vertical direction while the second half is configured to allow the optical transceiver to be assembled thereto only in the transverse direction.

17. The optical module as claimed in claim 16, wherein said first half and said second half are configured to be assembled to each other only along the transverse direction.

* * * * *